US008520535B2

(12) United States Patent
Dawson et al.

(10) Patent No.: US 8,520,535 B2
(45) Date of Patent: Aug. 27, 2013

(54) OPTIMIZATION PROCESS AND SYSTEM FOR A HETEROGENEOUS AD HOC NETWORK

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1638 days.

(21) Appl. No.: 11/755,811

(22) Filed: May 31, 2007

(65) Prior Publication Data

US 2008/0298314 A1 Dec. 4, 2008

(51) Int. Cl.
  *G01R 31/08* (2006.01)
  *G06F 11/00* (2006.01)
  *G06F 15/16* (2006.01)
  *G06F 15/173* (2006.01)
  *G08C 15/00* (2006.01)
  *H04J 1/16* (2006.01)
  *H04J 3/14* (2006.01)
  *H04J 1/00* (2006.01)
  *H04L 12/26* (2006.01)
  *H04W 4/00* (2009.01)

(52) U.S. Cl.
  USPC ........... 370/252; 370/238; 370/338; 709/203; 709/223; 709/241

(58) Field of Classification Search
  USPC ................. 370/252, 238, 338; 709/203, 223, 709/241
  See application file for complete search history.

(56) References Cited

U.S. PATENT DOCUMENTS

| 5,390,113 A | 2/1995 | Sampson |
| 5,437,054 A | 7/1995 | Rappaport et al. |
| 5,490,201 A | 2/1996 | Moberg et al. |
| 5,953,338 A | 9/1999 | Ma et al. |
| 5,959,975 A * | 9/1999 | Sofman et al. ................. 370/238 |
| 6,006,084 A | 12/1999 | Miller et al. |
| 6,035,281 A | 3/2000 | Crosskey et al. |

(Continued)

FOREIGN PATENT DOCUMENTS

| EP | 0999662 | 5/2005 |
| WO | 9915960 | 4/1999 |

(Continued)

OTHER PUBLICATIONS

Non-Final Office Action dated Mar. 4, 2010 in U.S. Appl. No. 11/755,775.

(Continued)

*Primary Examiner* — Alpus H Hsu
*Assistant Examiner* — Yee Lam
(74) *Attorney, Agent, or Firm* — Lisa J. Ulrich; Roberts Mlotkowski Safran & Cole, P.C.

(57) ABSTRACT

Method and system for optimizing selection of a network. The method includes identifying available lenders and existing networks within a vicinity of a borrower, selecting an optimization technique for completing a task of the borrower, calculating, for a plurality of network options, a value for completing the borrower's task according to the optimization technique, and selecting an optimum network option to complete the borrower's task. The plurality of network options includes forming a heterogeneous network composed of both a peer-to-peer network and a multiplexed network.

22 Claims, 8 Drawing Sheets

(56) References Cited

U.S. PATENT DOCUMENTS

| | | | |
|---|---|---|---|
| 6,047,268 A | 4/2000 | Bartoli et al. | |
| 6,366,907 B1 | 4/2002 | Fanning et al. | |
| 6,396,805 B2 | 5/2002 | Romrell | |
| 6,397,061 B1 | 5/2002 | Jordan et al. | |
| 6,415,271 B1 | 7/2002 | Turk et al. | |
| 6,477,522 B1* | 11/2002 | Young | 1/1 |
| 6,522,735 B1 | 2/2003 | Fortman et al. | |
| 6,653,933 B2 | 11/2003 | Raschke et al. | |
| 6,751,196 B1 | 6/2004 | Hulyalkar et al. | |
| 6,763,248 B1 | 7/2004 | Odamura | |
| 6,810,428 B1 | 10/2004 | Larsen et al. | |
| 6,850,764 B1 | 2/2005 | Patel | |
| 6,879,574 B2* | 4/2005 | Naghian et al. | 370/338 |
| 6,941,378 B2 | 9/2005 | Apostolopoulos et al. | |
| 6,954,616 B2 | 10/2005 | Liang et al. | |
| 6,954,790 B2 | 10/2005 | Forslöw | |
| 6,961,575 B2 | 11/2005 | Stanforth | |
| 6,975,613 B1 | 12/2005 | Johansson | |
| 6,980,511 B1 | 12/2005 | Li | |
| 6,990,113 B1 | 1/2006 | Wang et al. | |
| 7,016,375 B1 | 3/2006 | Rosenberg et al. | |
| 7,028,096 B1 | 4/2006 | Lee | |
| 7,043,225 B1 | 5/2006 | Patel et al. | |
| 7,058,014 B2 | 6/2006 | Sim | |
| 7,058,387 B2 | 6/2006 | Kumar et al. | |
| 7,065,367 B2 | 6/2006 | Michaelis et al. | |
| 7,075,890 B2 | 7/2006 | Ozer et al. | |
| 7,085,281 B2 | 8/2006 | Thomas et al. | |
| 7,089,301 B1 | 8/2006 | Labio et al. | |
| 7,130,283 B2 | 10/2006 | Vogel et al. | |
| 7,174,385 B2 | 2/2007 | Li | |
| 7,224,964 B2 | 5/2007 | Souissi et al. | |
| 7,240,015 B1 | 7/2007 | Karmouch et al. | |
| 7,257,632 B2 | 8/2007 | Zhang et al. | |
| 7,274,658 B2 | 9/2007 | Bornstein et al. | |
| 7,310,641 B2 | 12/2007 | Moore et al. | |
| 7,340,759 B1 | 3/2008 | Rodriguez | |
| 7,346,354 B2* | 3/2008 | Patel | 455/450 |
| 7,376,747 B2 | 5/2008 | Hartop | |
| 7,401,153 B2 | 7/2008 | Traversat et al. | |
| 7,440,573 B2 | 10/2008 | Lor et al. | |
| 7,447,656 B2 | 11/2008 | Parthasarathy | |
| 7,450,517 B2 | 11/2008 | Cho | |
| 7,450,949 B2 | 11/2008 | Choksi | |
| 7,460,549 B1 | 12/2008 | Cardei et al. | |
| 7,463,890 B2 | 12/2008 | Herz | |
| 7,489,656 B2 | 2/2009 | Guo et al. | |
| 7,530,102 B2 | 5/2009 | Moskowitz | |
| 7,546,342 B2 | 6/2009 | Li et al. | |
| 7,593,333 B2 | 9/2009 | Li et al. | |
| 7,609,748 B2* | 10/2009 | Karlsson | 375/141 |
| 7,623,524 B2* | 11/2009 | Muthukrishnan et al. | 370/395.41 |
| 7,633,908 B1 | 12/2009 | Kwong et al. | |
| 7,788,133 B2 | 8/2010 | Delenda | |
| 7,817,623 B2 | 10/2010 | Dawson et al. | |
| 7,830,834 B2 | 11/2010 | Das et al. | |
| 7,949,593 B2 | 5/2011 | Norris | |
| 2001/0027484 A1 | 10/2001 | Nishi | |
| 2001/0029182 A1 | 10/2001 | McCann et al. | |
| 2001/0052133 A1 | 12/2001 | Pack et al. | |
| 2002/0007328 A1 | 1/2002 | Hisamatsu et al. | |
| 2002/0013767 A1 | 1/2002 | Katz | |
| 2002/0029274 A1* | 3/2002 | Allen | 709/226 |
| 2002/0053033 A1 | 5/2002 | Cooper et al. | |
| 2002/0053082 A1 | 5/2002 | Weaver et al. | |
| 2002/0058499 A1 | 5/2002 | Ortiz | |
| 2002/0061009 A1 | 5/2002 | Sorensen | |
| 2002/0069278 A1 | 6/2002 | Forslöw | |
| 2002/0071477 A1 | 6/2002 | Orava | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1 | 9/2002 | Kulikov et al. | |
| 2002/0138414 A1 | 9/2002 | Baker, IV | |
| 2002/0141358 A1 | 10/2002 | Requena | |
| 2002/0144266 A1 | 10/2002 | Goldman et al. | |
| 2002/0145978 A1 | 10/2002 | Batsell et al. | |
| 2002/0173272 A1 | 11/2002 | Liang et al. | |
| 2003/0032433 A1 | 2/2003 | Daniel et al. | |
| 2003/0037033 A1 | 2/2003 | Nyman et al. | |
| 2003/0053493 A1 | 3/2003 | Graham Mobley et al. | |
| 2003/0068975 A1 | 4/2003 | Qiao et al. | |
| 2003/0117978 A1 | 6/2003 | Haddad | |
| 2003/0120594 A1 | 6/2003 | Shaginaw et al. | |
| 2003/0137976 A1 | 7/2003 | Zhu et al. | |
| 2003/0139180 A1 | 7/2003 | McIntosh et al. | |
| 2003/0139990 A1 | 7/2003 | Greco | |
| 2003/0153338 A1 | 8/2003 | Herz et al. | |
| 2003/0235174 A1 | 12/2003 | Pichna et al. | |
| 2003/0235175 A1 | 12/2003 | Naghian et al. | |
| 2004/0006621 A1 | 1/2004 | Bellinson et al. | |
| 2004/0022224 A1 | 2/2004 | Billhartz | |
| 2004/0029553 A1 | 2/2004 | Cain | |
| 2004/0030649 A1 | 2/2004 | Nelson et al. | |
| 2004/0064351 A1 | 4/2004 | Mikurak | |
| 2004/0078323 A1 | 4/2004 | Johnston et al. | |
| 2004/0098329 A1 | 5/2004 | Tilton | |
| 2004/0100929 A1 | 5/2004 | Garcia-Luna-Aceves | |
| 2004/0128231 A1 | 7/2004 | Morita | |
| 2004/0128262 A1 | 7/2004 | Nafousi | |
| 2004/0156312 A1 | 8/2004 | Salonidis et al. | |
| 2004/0162871 A1 | 8/2004 | Pabla et al. | |
| 2004/0165548 A1 | 8/2004 | Backes | |
| 2004/0185777 A1 | 9/2004 | Bryson | |
| 2004/0192204 A1 | 9/2004 | Periyalwar et al. | |
| 2004/0203820 A1 | 10/2004 | Billhartz | |
| 2004/0221319 A1 | 11/2004 | Zenoni | |
| 2004/0260808 A1 | 12/2004 | Strutt | |
| 2004/0264466 A1 | 12/2004 | Huang | |
| 2005/0036475 A1 | 2/2005 | Nishiyama et al. | |
| 2005/0063419 A1 | 3/2005 | Schrader et al. | |
| 2005/0080872 A1 | 4/2005 | Davis et al. | |
| 2005/0111418 A1 | 5/2005 | Yang et al. | |
| 2005/0153725 A1 | 7/2005 | Naghian et al. | |
| 2005/0157661 A1 | 7/2005 | Cho | |
| 2005/0169209 A1 | 8/2005 | Miu et al. | |
| 2005/0169257 A1 | 8/2005 | Lahetkangas et al. | |
| 2005/0193221 A1 | 9/2005 | Yoneyama | |
| 2005/0203834 A1 | 9/2005 | Prieston | |
| 2005/0213503 A1 | 9/2005 | Guo et al. | |
| 2006/0002326 A1 | 1/2006 | Vesuna | |
| 2006/0034330 A1 | 2/2006 | Iwamura | |
| 2006/0036518 A1 | 2/2006 | O'Neill | |
| 2006/0085543 A1 | 4/2006 | Hrastar et al. | |
| 2006/0095582 A1 | 5/2006 | Nitya et al. | |
| 2006/0109787 A1 | 5/2006 | Strutt et al. | |
| 2006/0114853 A1 | 6/2006 | Hasty et al. | |
| 2006/0126504 A1 | 6/2006 | Meier et al. | |
| 2006/0167784 A1 | 7/2006 | Hoffberg | |
| 2006/0176829 A1 | 8/2006 | McLaughlin et al. | |
| 2006/0179143 A1 | 8/2006 | Walker et al. | |
| 2006/0187858 A1 | 8/2006 | Kenichi et al. | |
| 2006/0193295 A1 | 8/2006 | White et al. | |
| 2006/0205408 A1 | 9/2006 | Nakagawa et al. | |
| 2006/0224502 A1 | 10/2006 | McGowan | |
| 2006/0233377 A1 | 10/2006 | Chang et al. | |
| 2006/0265508 A1 | 11/2006 | Angel et al. | |
| 2006/0274214 A1 | 12/2006 | Carro | |
| 2006/0294258 A1 | 12/2006 | Powers-Boyle et al. | |
| 2007/0005797 A1 | 1/2007 | Fontijn et al. | |
| 2007/0019771 A1* | 1/2007 | Ambuehl et al. | 375/372 |
| 2007/0117537 A1 | 5/2007 | Hui et al. | |
| 2007/0124204 A1 | 5/2007 | de Boer et al. | |
| 2007/0140272 A1 | 6/2007 | Gulliksson | |
| 2007/0206528 A1 | 9/2007 | Walton et al. | |
| 2007/0258359 A1 | 11/2007 | Ogasawara et al. | |
| 2007/0298764 A1 | 12/2007 | Clayton | |
| 2008/0008140 A1 | 1/2008 | Forssell | |
| 2008/0040481 A1 | 2/2008 | Joshi et al. | |
| 2008/0104202 A1* | 5/2008 | Barrett et al. | 709/219 |
| 2008/0167982 A1 | 7/2008 | Leo et al. | |
| 2008/0204448 A1 | 8/2008 | Dawson et al. | |
| 2008/0281529 A1 | 11/2008 | Tenenbaum et al. | |

| | | | |
|---|---|---|---|
| 2008/0298283 | A1 | 12/2008 | Dawson et al. |
| 2008/0298314 | A1 | 12/2008 | Dawson et al. |
| 2008/0301017 | A1 | 12/2008 | Dawson et al. |
| 2009/0323587 | A1 | 12/2009 | Trachewsky et al. |
| 2010/0008221 | A1 | 1/2010 | Hong et al. |
| 2010/0114743 | A1 | 5/2010 | Misraje et al. |
| 2010/0205116 | A1 | 8/2010 | Erlanger |

FOREIGN PATENT DOCUMENTS

| | | |
|---|---|---|
| WO | 03037009 | 5/2003 |
| WO | 2004001585 | 12/2003 |
| WO | 2006004628 | 1/2006 |

OTHER PUBLICATIONS

Final Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-Final Office Action dated Jan. 25, 2010 in U.S. Appl. No. 11/755,771.
D. Zhu et al., "QoS Aware Wireless Bandwidth Aggregation (QAWBA) by Integrating Cellular and Ad-hoc Networks.".
D. Zhu et al., "Using Cooperative Multiple Paths to Reduce File Download Latency in Cellular Data Networks.".
Office Action dated Jun. 4, 2010 in U.S. Appl. No. 11/755,780.
Office Action dated Jun. 22, 2010 in U.S. Appl. No. 11/755,776.
Office Action dated Jul. 12, 2010 in U.S. Appl. No. 11/755,808.
Notice of Allowance dated Jun. 9, 2010 in U.S. Appl. No. 11/755,802.
Notice of Allowance dated Jun. 28, 2010 in U.S. Appl. No. 11/755,771.
Notice of Allowance dated Jul. 13, 2010 in U.S. Appl. No. 11/755,778.
Notice of Allowance dated Aug. 16, 2010 in U.S. Appl. No. 11/755,763.
Non-final Office Action dated Nov. 25, 2009 in U.S. Appl. No. 11/755,780.
Non-final Office Action dated Nov. 25, 2009 in U.S. Appl. No. 11/755,802.
Non-final Office Action dated Dec. 24, 2009 in U.S. Appl. No. 11/755,776.
Non-final Office Action dated Jan. 22, 2010 in U.S. Appl. No. 11/755,778.
Non-final Office Action dated Jan. 21, 2010 in U.S. Appl. No. 11/755,808.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Non-final Office Action dated Oct. 19, 2009 in U.S. Appl. No. 11/755,788.
Qui et al.. "Bandwidth in Ad Hoc Networks: A Price-Based Approach," 2003, IEEE, pp. 1-10.
Office Action dated Mar. 3, 2011 in U.S. Appl. No. 11/755,800.
Final Office Action dated Mar. 25, 2011 in U.S. Appl. No. 11/755,786.
Notice of Allowance dated Aug. 25, 2010 in U.S. Appl. No. 11/755,780.
Office Action dated Sep. 14, 2010 in U.S. Appl. No. 11/755,788.
Final Office Action dated Sep. 15, 2010 in U.S. Appl. No. 11/755,782.
Notice of Allowance dated Oct. 12, 2010 in U.S. Appl. No. 11/755,808.
Office Action dated Oct. 29, 2010 in U.S. Appl. No. 11/755,786.
IEEE 802.22, Wireless RANs, 220 pages, Mar. 2006.
Michelini et al, Spectral Sharing Across 2G-3G Systems, IEEE, 5 pages, 2003.
Das et al, A Structured Channel Borrowing Scheme for Dynamic Load Balancing in Cellular Networks, IEEE, 8 pages, 1997.
Non-final Office Action dated Dec. 23, 2008 in U.S. Appl. No. 11/755,806.
Final Office Action dated Jun. 3, 2009 in U.S. Appl. No. 11/755,806.
Final Office Action dated Jun. 9, 2009 in U.S. Appl. No. 11/755,806.
Final Office Action dated Nov. 26, 2010 in U.S. Appl. No. 11/755,775.
Notice of Allowance dated Dec. 14, 2010 in U.S. Appl. No. 11/755,776.
Office Action dated Jan. 24, 2011 in U.S. Appl. No. 11/755,779.
Notice of Allowance dated Feb. 14, 2011 in U.S. Appl. No. 11/755,788.
Office Action dated Jul. 21, 2011 in U.S. Appl. No. 11/755,775.
Office Action dated Jul. 26, 2011 in U.S. Appl. No. 11/755,779.
Notice of Allowance dated Jun. 10, 2011 in U.S. Appl. No. 11/755,786.
Office Action dated Aug. 18, 2011 in U.S. Appl. No. 11/755,800.
Office Action dated Jan. 9, 2012 in U.S. Appl. No. 11/755,775.
Final Office Action dated Jan. 26, 2012 in U.S. Appl. No. 11/755,800.
Office Action dated Mar. 7, 2012 in U.S. Appl. No. 11/755,779.
BPAI Decision dated Mar. 1, 2012 in U.S. Appl. No. 11/755,806.
Notice of Allowance dated Apr. 13, 2012 in U.S. Appl. No. 11/755,806.
Notice of Allowance dated Jun. 26, 2012 in U.S. Appl. No. 11/755,779, 10 pages.
Examiner's Answer dated Aug. 15, 2012 in U.S. Appl. No. 11/755,800, 17 pages.
Final Office Action dated Jul. 13, 2012 in U.S. Appl. No. 11/755,775, 16 pages.
"ad hoc", http://www.thefreedictionary.com/Ad-hoc, Jul. 3, 2012, pp. 1-2.
Office Action dated Oct. 19, 2012 for U.S. Appl. No. 13/489,673; 11 pages.
Office Action dated Dec. 24, 2012 for U.S. Appl. No. 11/755,775; 15 pages.
Office Action dated Feb. 4, 2013 for U.S. Appl. No. 13/489,673; 14 pages.
Final Office Action dated May 17, 2013 for U.S. Appl. No. 11/755,775; 18 pages.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

OPTIMIZATION PROCESS AND SYSTEM FOR A HETEROGENEOUS AD HOC NETWORK

CROSS-REFERENCE TO RELATED APPLICATIONS

This application is related to the following copending applications, all of which are incorporated herein by reference in their entireties: application Ser. No. 11/755,808, published as U.S. Patent Application Publication No. 2008/0299988; application Ser. No. 11/755,780, published as U.S. Patent Application Publication No. 2008/0298327; and application Ser. No. 11/755,775, published as U.S. Patent Application Publication No. 2008/0301017.

FIELD OF THE INVENTION

The invention generally relates to systems and processes for optimizing a borrower's selection of lender bandwidth in an ad hoc network and, more particularly, to systems and processes for optimizing a borrower's selection of lender bandwidth in network composed of individual lenders in a non-multiplexed peer-to-peer architecture and/or lenders associated with a multiplexed architecture according to various optimization objectives.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method includes identifying available lenders and existing networks within a vicinity of a borrower, selecting an optimization technique for completing a task of the borrower, calculating, for a plurality of network options, a value for completing the borrower's task according to the optimization technique, and selecting an optimum network option to complete the borrower's task. The plurality of network options includes forming a heterogeneous network composed of both a peer-to-peer network and a multiplexed network.

In another aspect of the invention, a system for finding an optimum network for a requester of bandwidth includes a device to identify available bandwidth lenders and existing networks within a vicinity of the requester, a selector unit to select an optimization technique for completing a task of the requester, a calculator to calculate, for a plurality of network options, a value for completing the requester's task according to the optimization technique, and a selection device to select the optimum network from the calculated values. The network options include a heterogeneous network composed of a peer-to-peer network and a multiplexed network.

In another aspect of the invention, a system includes a server having a database containing data associated with one or more instructions for implementing peer-to-peer, multiplexed, and heterogeneous ad-hoc networks. The system also includes at least one of a hardware and software component for optimizing selection of, from a plurality of network options, an optimum network based upon an optimization technique selected by the borrower. The plurality of network options includes a heterogeneous network composed of a peer-to-peer network and a multiplexed network, and the optimum network is one of joined by the borrower or formed to include the borrower.

In another aspect of the invention, a method for optimizing selection of a network in an ad hoc network architecture includes a computer infrastructure operable to select an optimization technique for completing a task, calculate, for a plurality of network options, a value for completing the task according to the optimization technique, and select an optimum network to complete the task. The plurality of network options includes forming a heterogeneous network composed of both a peer-to-peer network and a multiplexed network.

In another aspect of the invention, a computer program product includes a computer usable medium having readable program code embodied in the medium and includes at least one component to identify available lenders and existing networks within a vicinity of a borrower, select an optimization technique for completing a task of the borrower, calculate, for a plurality of network options, a value for completing the borrower's task according to the optimization technique, and select an optimum network option to complete the borrower's task. The plurality of network options includes forming a heterogeneous network composed of both a peer-to-peer network and a multiplexed network.

DETAILED DESCRIPTION OF EMBODIMENTS OF THE INVENTION

The present invention is directed to a process and system for optimizing a borrower's selection of individual lenders in a non-multiplexed peer-to-peer architecture for mobile ad hoc networks and of lenders associated with a multiplexed architecture according to various optimization objectives of the borrower. The optimization can be based on time, cost, bandwidth or other optimization considerations. Further, borrower's not yet part of an ad hoc network can decide whether to join an existing network or form a new network, while borrower's already part of a network can decide whether to change networks.

As decisions regarding selection of network and whether to change networks are not easily made within a short period of time, the borrower can predefine preferences in order to automatically divide and assign files and automatically select a certain number of lenders. These predefined preferences can be stored in user's device, e.g., notebook, PDA, smart phone, etc., or can be stored in a remote location maintained by a service provider, e.g., a centralized database for storing information regarding borrowers and lenders.

In a heterogeneous network, a borrower can be connected directly to individual lenders in a peer-to-peer architecture and to lenders associated with a multiplexed architecture. According to the invention, when part of a peer-to-peer architecture, part of a multiplexed architecture, or part of a heterogeneous architecture, the borrower can evaluate his/her decisions to determine whether a change of networks is warranted. By using a scheme for borrowing bandwidth within an ad hoc network, multiple disparate wireless connections in conjunction with multiple devices using a variety of service providers, for example, can be used to create a single virtual fat pipe for transmission of data over a network. The individuals who share their current connections, e.g., bandwidth, acting as gateway devices, are lenders of bandwidth; whereas, the individuals who require additional bandwidth are borrowers. In this way, a borrower in need of bandwidth may borrow bandwidth from lenders in an ad hoc network, utilizing the lenders' bandwidth (e.g., cellular connection to the Internet, hotspot connection, etc.) in the manner best suited to the borrower's task.

System Environment

Figure 1:
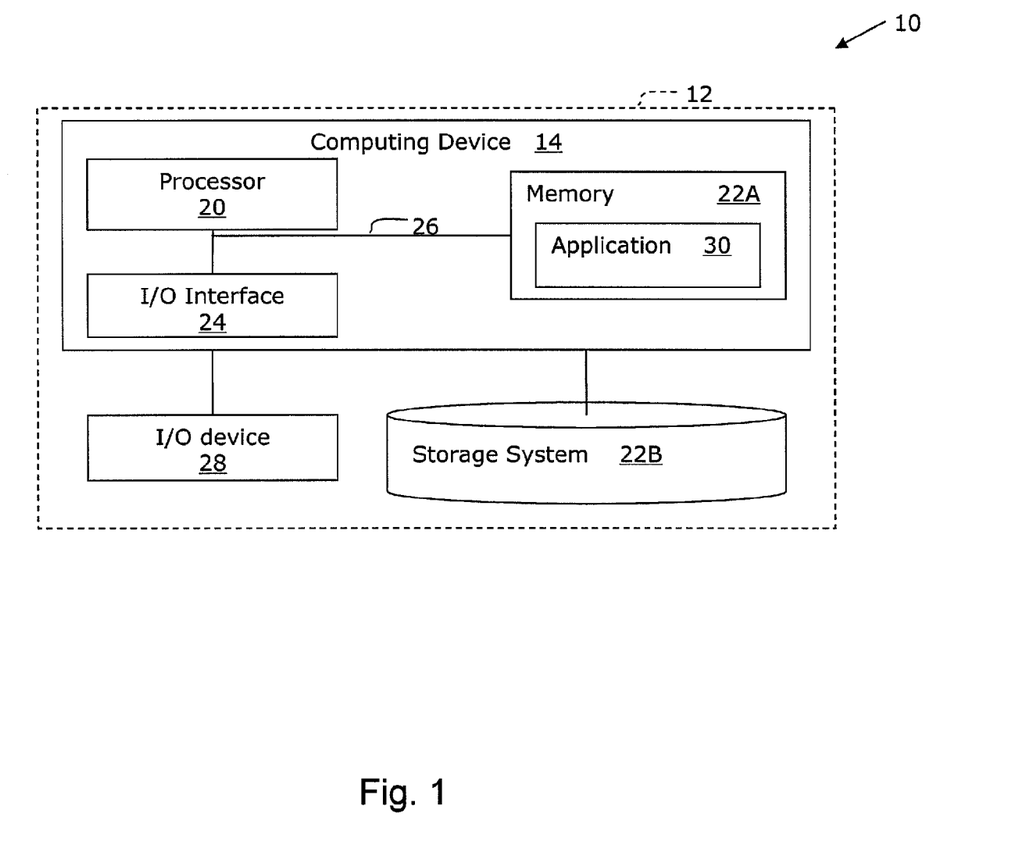
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to permit compensation schemes between borrowers, or their service providers, and lenders, or their service providers, for borrowed bandwidth within an ad hoc network, in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Embodiments

"Ad hoc" relationships will become increasingly important in the communal sharing of immediately available resources, and most particularly, the sharing of bandwidth. With the creation of peer-to-peer networks and torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is a 802.11g local area connection that creates a high-speed wireless connection between two cellular phone devices within close range (high bandwidth), and wherein the cellular phones' cellular connection may provide bandwidth at less than one percent of the 802.11g connection.

The present invention is directed to systems and methods by which a borrower of bandwidth in an ad hoc network selects lenders of bandwidth in an effort to optimize the cost of services, time of upload/download, etc. The specific pricing mechanisms which can be implemented with the invention are disclosed in the following applications, all which are hereby incorporated by reference in their entirety. For example, the negotiation and acceptance of agreed pricing, and the formation and rearrangement of the bandwidth sharing ad hoc networks is set forth in application Ser. No. 11/755,775. The negotiation and acceptance of agreed pricing, and the formation and rearrangement of lending devices that perform multiplexing functions is set forth in application Ser. No. 11/755,779, published as U.S. Patent Application Publication No. 2008/0300889. Price offerings are set forth in application Ser. No. 11/755,782, published as U.S. Patent Application Publication No. 2008/0300890. Market price offerings are set forth in application Ser. No. 11/755,800, published as U.S. Patent Application Publication No. 2008/029828411.

To access a wireless network, a user needs an access point connection, e.g., a wireless router, hot spot, wireless connection port. However, when a user is not in the vicinity of such an access point connection, various devices, e.g., cell phones, can be used to provide a connection to a wireless network, but the bandwidth may be limited, i.e., not sufficient to enable fast exchanges, e.g., uploads, downloads, etc. Thus, through the ad hoc network the user or borrower can use unused bandwidth of others or lenders to partition tasks and speed up transmission, thereby reducing wait time.

In general, the invention comprises optimizing the selection of lenders based upon their different payment schemes and available bandwidth. For example, in an embodiment of the invention, a borrower of bandwidth may select lenders so as to minimize the cost of completing the task. In another embodiment, a borrower of bandwidth may select lenders so as to minimize the time for completing the task. In another embodiment, a borrower may select lenders so as to maximize the throughput of data to complete the task. In another embodiment, a borrower may select lenders in order to reduce the risk of drop-offs during the task. In another embodiment, a borrower may select lenders based upon the lenders history of reliability. In another embodiment, a borrower may select lenders in an effort to maximize lender capabilities.

General Overview of Ad Hoc Networks

In order to utilize compensation mechanisms for sharing bandwidth, an ad hoc network may be created between a borrower node and one or more lender nodes, and a compensation scheme for the shared bandwidth may be established. This process may include both an initial discovery mechanism of the proposed role each node may play, and a negotiation and acceptance of the agreed compensation scheme.

Figure 2:
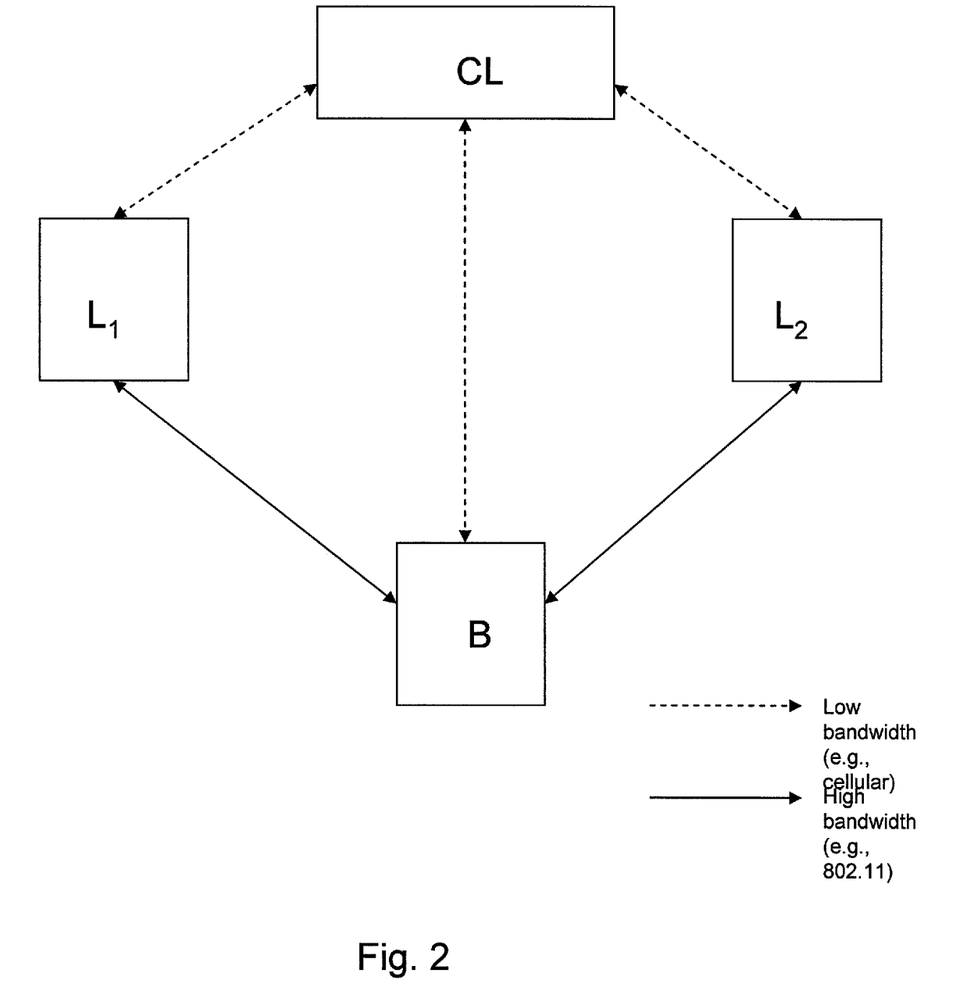
FIG. 2 is an overview of a peer-to-peer bandwidth-sharing ad hoc network.

FIG. 2 is a general overview of a non-multiplexed, peer-to-peer bandwidth sharing architecture which may be implemented with the systems and methods of the invention. An illustrative non-multiplexed, peer-to-peer bandwidth sharing architecture is set forth in application Ser. No. 11/755,808. In this implementation, a borrower B may request information, e.g., transfer of files, from a central location, CL (or distributed locations). To increase its bandwidth capacity, the borrower B may request bandwidth from any of the lenders, $L_1$ or $L_2$ via any known wireless protocol. By way of example, upon a broadcast request from the borrower B, any of the lenders, $L_1$ or $L_2$ may allow the borrower B to use their excess bandwidth for file transfers with the central location, CL (or distributed locations). Upon authorization, the lenders, via a wireless protocol, for example, will download information from the central locations, CL, and send this information to the borrower, B, thus effectively increasing the borrower's bandwidth (or distributed locations).

Figure 3:
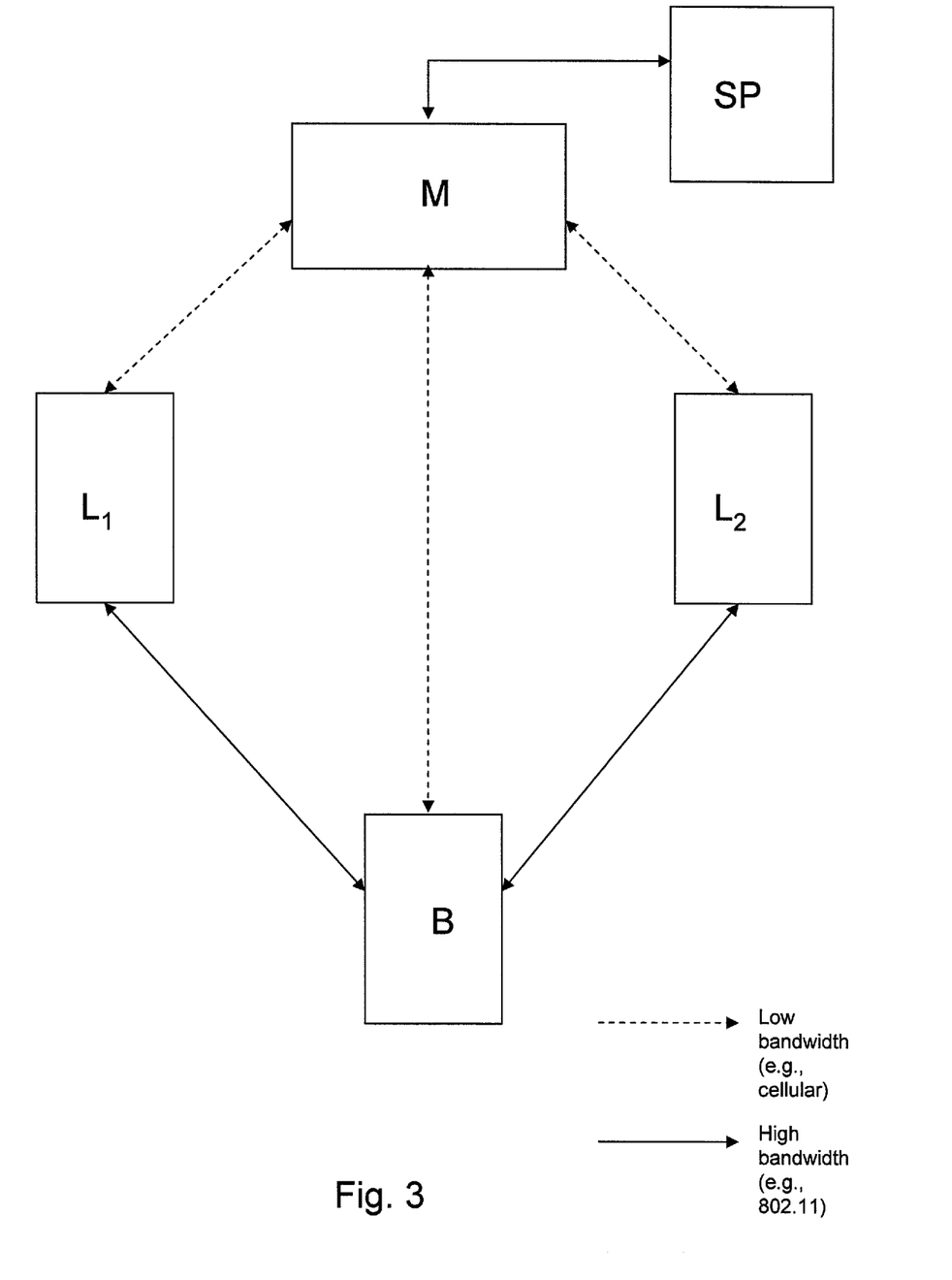
FIG. 3 is an overview of a multiplexed bandwidth-sharing ad hoc network.

FIG. 3 is a general overview of a multiplexed gateway bandwidth sharing architecture which may be implemented with the invention. An illustrative multiplexed gateway bandwidth sharing architecture is set forth in application Ser. No. 11/755,780. In this implementation, a borrower B will request a multiplexer M to set up an ad-hoc network. The multiplexer M may communicate with a service provider SP and connect to one or more lenders, $L_1$ and $L_2$, via a wireless network. Once a network is established, the multiplexer will manage the network, including the bandwidth allocations provided by each of the lenders, for example.

Figure 4:
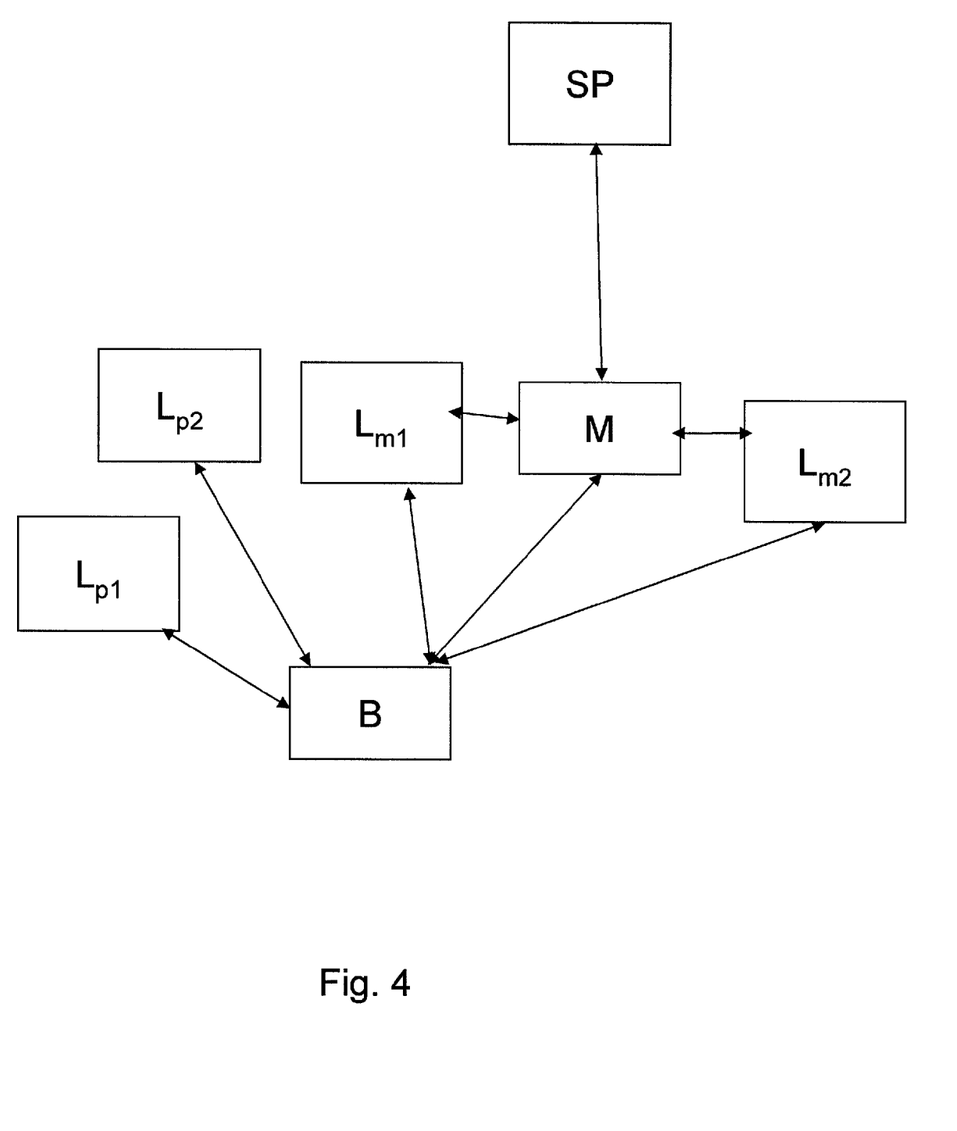
FIG. 4 is an overview of a heterogeneous network composed of both a peer-to-peer architecture and a multiplexed gateway architecture.

FIG. 4 is a general overview of a heterogeneous network composed of both a peer-to-peer architecture and a multiplexed gateway architecture which may be implemented with the invention. In this implementation, a borrower B can invite individual lenders $L_{p1}$ and $L_{p2}$ to set up an ad-hoc network through a peer-to-peer architecture and invite lenders $L_{m1}$ and $L_{m2}$ through a request to multiplexer M, which is coupled to a service provider SP, to set up an ad-hoc network through a gateway multiplexed network. Once the heterogeneous network is established, the borrower will manage the bandwidth and data chunk allocations to the peer-to-peer lenders $L_{p1}$ and $L_{p2}$ and the multiplexer will manage the network, including the bandwidth and data chunk allocations to the gateway multiplexed lenders $L_{m1}$ and $L_{m2}$.

Initial Formation of the Ad Hoc Network

Figure 5:
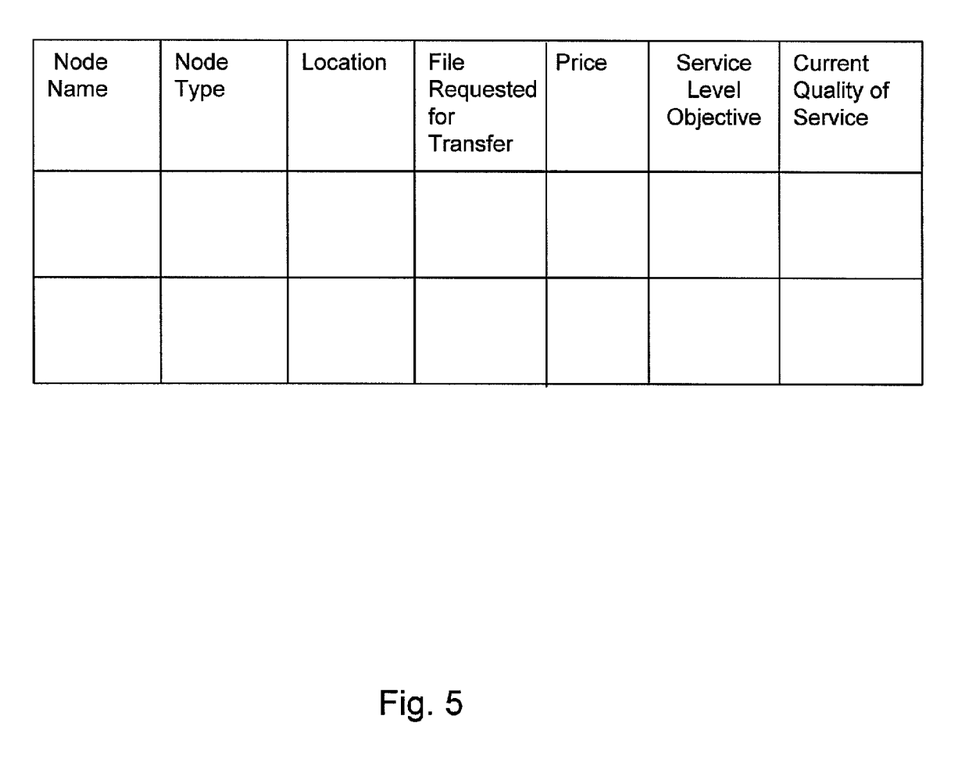
FIG. 5 is an overview for initiating an ad hoc network.

In the peer-to-peer and/or multiplexed gateway environments, in order to form a new ad hoc network, a borrower may scan all available potential lenders and prioritize the potential lenders for a data transfer. The formation of the ad hoc network, in embodiments, may use a "borrower/lender" table as shown in FIG. 5. In this example, the borrower or gateway (e.g., multiplexer) will broadcast the table to potential lenders which, in turn, will return the table, with information pertinent to the lender, to the borrower or the gateway. Using this information, the borrower or lender can establish an ad hoc network with lenders that meet certain criteria, e.g., reliability, speed, availability and/or costs.

In the borrower/lender table of FIG. 5, the "Node Name" column may be the unique identifier of a node such as the borrow and lenders. For example, this could be a hostname, a Bluetooth® name or any other information that can uniquely describe the node. The "Node Type" column may describe whether this node is a borrow, a lender, or a gateway. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where and how the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in application Ser. No. 11/755,775.

Flow Diagrams

The flow diagrams described herein may be implemented in environments that enable the borrower to select lender's bandwidth based upon optimization criteria. By way of example, the flow diagrams can be implemented in the environment of FIG. 1 to provide instructions for selecting one or more lenders' bandwidth in an ad hoc network and/or may be implemented in the environment of FIGS. 2 and/or 3 to provide instructions for selecting one or more lenders' bandwidth in the non-multiplexed, peer-to-peer bandwidth sharing architecture and/or in the gateway multiplexed architecture. In the various disclosed exemplary embodiments, described below, a bandwidth sharing agreement may be reached on data, quality of service (QoS) and associated costs. This agreement may include compensation instructions for compensating one or more lenders of bandwidth in the ad hoc network.

The flow diagrams may represent a high-level block diagram of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 6:
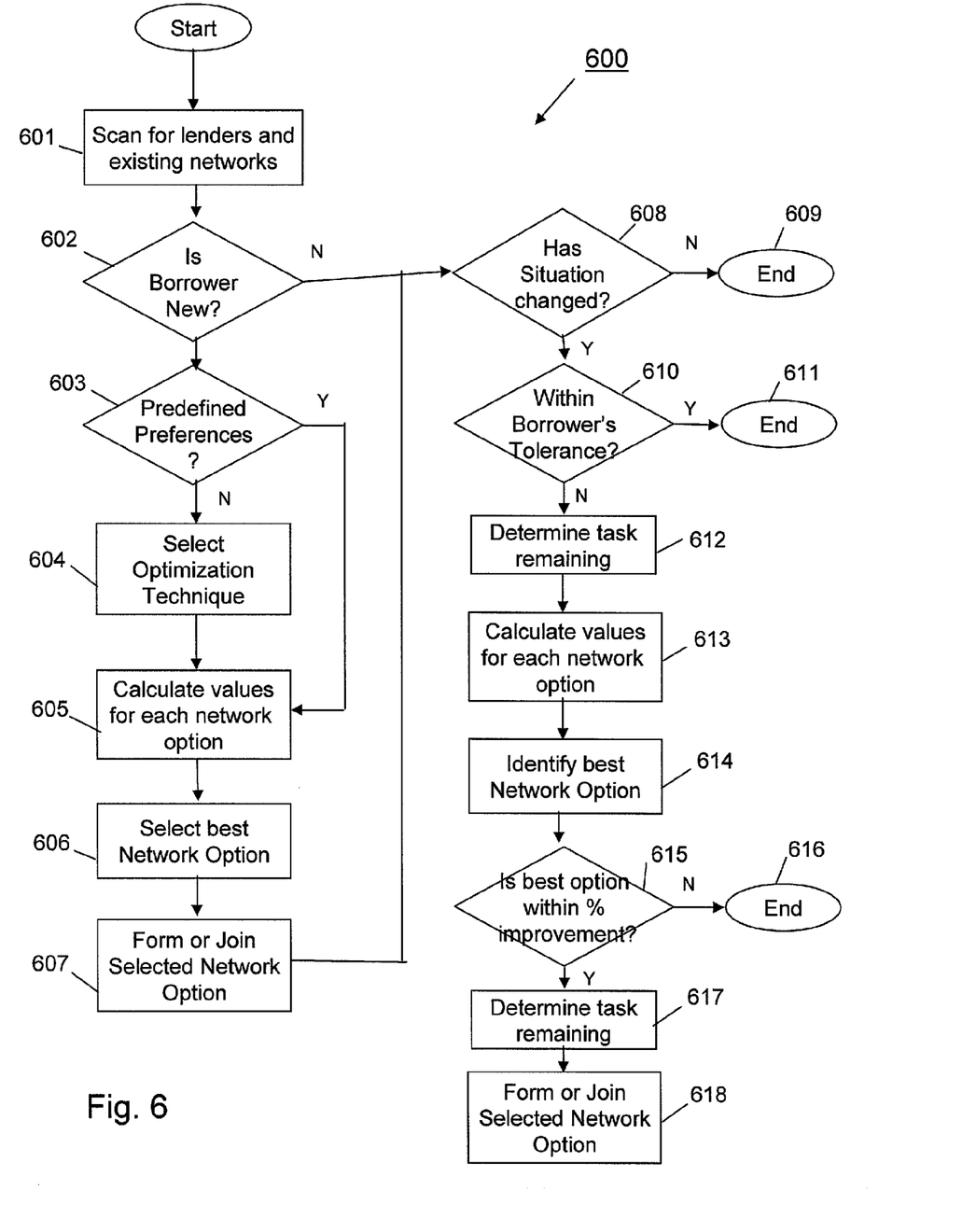
FIG. 6 is a flow diagram for generally implementing the invention.

By way of non-limiting example, FIG. 6 illustrates a flow diagram 600 of a process for optimizing a borrower's selection of lenders. It is understood that this and all other illustrated examples are provided to facilitate explanation of the invention, but are not to be construed as limiting, such that other flow diagrams and/or processes for optimizing a borrower's selection of network options in accordance with the features of the invention are within the scope of the instant invention.

As shown in FIG. 6, the flow diagram 600 can begin with a scan of available lenders and/or existing networks can be performed at step 601 to find, in the vicinity of his/her requesting location, both individual available lenders and lenders currently part of either a peer-to-peer or multiplexed ad hoc network. The search or scan for available lenders can be performed by a device utilized for searching or scanning for wireless connection ports, hot spots, etc. At step 602, a determination can be made whether the borrower requesting bandwidth is new, i.e., whether the borrower is already part of an existing ad hoc network. Before a new borrower decides whether to join an existing multiplexed ad hoc network, he can consider that lenders with an existing multiplexer implies that multiplexed network has an existing borrower. In this case, if the new borrower would like to join the existing multiplexed network, the borrower will have to wait until the existing borrower's task is completed through the multiplexed network. Thus, the new borrower can decide whether the existing multiplexed gateway is worth waiting for or whether individual lenders should be sought for forming a peer-to-peer network or whether a new multiplexed network should be formed.

When lenders are available, the borrower can make choices between the various available lenders according to a variety of selection criteria. When the borrower is identified as a new borrower that is not already part of an existing network at step 602, a determination is made at step 603 whether the borrower has predefined preferences established. When such preferences are predefined and stored, e.g., in the user's device or in a remote database of a service provider, the flow diagram proceeds to step 605. If predefined preferences are not stored, the borrower can select the desired optimization technique for establishing the ad hoc network for selecting lenders at step 604. By way of non-exclusive example, the new borrower at step 604 can select an optimization technique that determines: minimum time for completing a task, e.g., uploading/downloading one or more files, (see FIG. 7); minimum cost for completing task (see FIG. 8); maximizing availability of lenders, i.e., minimizing drop-offs; leveraging capabilities of different types of ad hoc networks (discussed below); or maximizing throughput (discussed below).

After the borrower's optimization technique is established, the cost for each network option for the selection optimization technique is calculated at step 605. The network options, by way of non-limiting example, can include: joining an existing multiplexed ad hoc network; requesting individual lenders to form a new multiplexed network; joining an existing non multiplexed peer-to-peer ad hoc network; requesting individual lenders to form new a peer-to-peer network; or requesting lenders to form a heterogeneous network in which the new borrower can request lenders to join a new multiplexed network and request lenders to form a peer-to-peer network. Once the calculations are completed, the borrower can select which network option to proceed with at step 606. The selection can be made by prompting the borrower for a selection or a borrower's predefined preference can be stored to select the option corresponding to the results from the best calculation result. After the network option is selected, the ad hoc network is formed at step 607 to complete the borrower's desired task.

If the borrower at step 601 is found to already be part of an existing ad hoc network, e.g., a multiplexed, peer-to-peer, or heterogeneous network, a determination is made whether the borrower is satisfied with his/her current network, and, if desired by the borrower, change the borrower to a new or alternative ad hoc network based upon a selected new network option. Also, after a new borrower has selected an optimum network option, the borrower, for the purpose of this flow diagram, can also be considered an existing borrower, such that the flow diagram, after step 607, can proceed to step 608.

In deciding to change networks, the borrower can consider factors such as, e.g., percentage of tolerance and expected percentage of improvement. Percentage of tolerance can refer to how much a borrower can tolerate given that his/her current network situation, e.g., service, has worsened, such that the network no longer operates at the expected level of quality. That is, when the borrower can no longer tolerate the service provided by the current network, the borrower may consider looking into the alternatives to remedy the situation. Expected percentage of improvement can refer to a defined percentage of improved service of an alternative network over the existing network the borrower would accept as sufficiently better service to warrant changing networks. In this regard, if the new network will provide significantly better service, the borrower may find it advantageous to change.

While it is understood that borrowers in general would not change networks unless they can no longer tolerate current service and the alternatives provide potentially better service, steps 608-618 set forth an exemplary process for a borrower to decide whether a new or alternative network should be created or joined or whether the current service is satisfactory to the borrower's needs. A determination is made as step 608 whether the situation of the current network has changed. Situation changes can be considered as adverse changes in the borrower's current network or advantageous changes occurring outside of the current network. Adverse changes can include a determination that actual parameters of the current network are worse than expected (when the borrower agreed to be part of the current network), e.g., drops in bandwidth of the multiplexer, drops of aggregated bandwidth of the lenders, or disconnection of certain lenders, etc. Advantageous changes can include, e.g., potential lenders are offering cheaper price, or potential lenders have much faster bandwidth, etc. If the situation at step 608 has not changed, no further action is required and the process ends at step 609. If, on the other hand, the situation at step 608 has changed, a determination is made at step 610 whether the situation change is within the borrower's percentage of tolerance. By way of example, the borrower can compare the expected quality of the network (when the borrower joined) to the current situation with regards to the borrower's selected optimization objective. If the situation change is within the borrower's percentage of tolerance, such that the change is situation is not significant enough to the borrower to warrant changing networks, the process can be terminated at step 611. However, if the situation change is not within the borrower's percentage of tolerance, i.e., the current situation deviates more than (100%—percentage of tolerance) from the original situation, a determination is made at step 612 of the amount of the borrower's current task that is unfinished.

For the remaining portion of the borrower's task, i.e., the uncompleted portion of the upload or download, each alternative network option can be calculated in terms of the borrower's predefined optimization technique at step 613. The calculations performed can be the same as those discussed at step 605. Once the calculations are completed, the best network alternative for the borrower's optimization techniques is identified at step 614. While a best network alternative has been identified, a determination is made at step 615 whether this best alternative meets the borrower's expected percentage of improvement. That is, parameters relevant to the borrower's optimization technique in the borrower's current network and in the best network alternative can be compared to determine how much better service to the borrower be if the best network alternative were selected as a new network. If the best alternative does not meet the borrower's percentage of improvement, the borrower will not likely be motivated to change networks, such that the process will end at step 616. Alternatively, if the percentage of improvement is within the borrower's selected range, another determination is made at step 617 of the remaining amount of the borrower's task to be completed, i.e., this amount may have changed while the alternatives were evaluated. Then, at step 618, the remaining task is assigned to the best network alternative.

Consider an illustrative example of the borrower's decision process for considering changing from a multiplexed ad hoc network when the lenders' bandwidth drops. For this example, it can be assumed the borrower's percentage of tolerance is 80% and the expected improvement of the alternatives is 10%. As discussed above, it is understood the borrower can tolerate any deviation up to 20% from the expected quality of his current network, otherwise, he will look for alternatives. The service quality of the alternatives can be determined, and, if the best alternative offers 10% improvement over the current network, the borrower can switch to the new alternative.

In this regard, the alternatives available to the borrower can be, e.g., to identify lenders whose bandwidth has dropped below their expected speed, and replace them with new lenders who have faster bandwidth; to keep the existing multiplexed ad hoc network and ask more lenders to join this network; or to keep the existing multiplexed ad hoc network and ask extra (individual) lenders to form a peer-to-peer network, so as to create a heterogeneous network composed of both the multiplexed network and the peer-to-peer. Each alternative could then be evaluated in terms of the borrower's optimization technique, e.g., to minimize time. If, as assumed here, the best alternative is at least 10% better than the borrower's current situation, i.e., the best alternative takes less than 90% of the time than the current network to finish the remaining job, then the borrower can switch to the best alternative network.

Further, it is noted the above-described optimization techniques can exist within a multi-variable realm, i.e., a borrower may want to maximize throughput but within some reasonable fiscal bounds. That is, while the borrower may want and appreciate getting excellent performance requirements, if this performance comes at very high price, e.g., $1,000/minute, it is likely the borrower will not find this result acceptable even though the borrowers indicated high throughput was his/her objective for completing the task. Conversely, if the borrower's stated objective is cost and the low-cost option only buys 1 kB/minute, the connection is not optimal, due to the bandwidth being less than a threshold acceptability.

Figure 7:
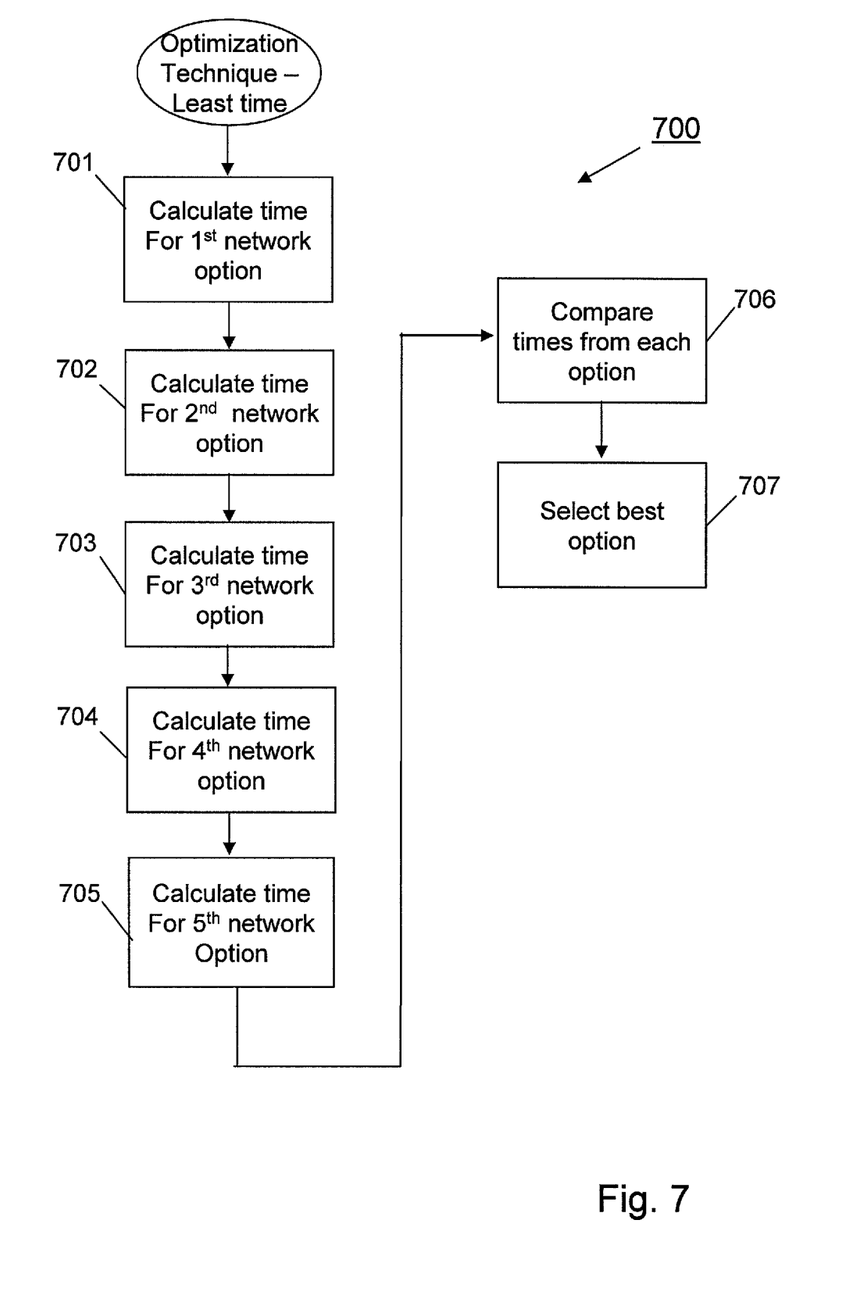
FIG. 7 is a flow diagram for generally implementing optimization for minimum time in accordance with aspects of the invention.

As discussed above, FIGS. 7 and 8 illustrate exemplary flow diagrams for calculating optimized parameters for each network option as discussed with reference to step 605. FIG. 7 illustrates the flow diagram process 700 for calculating network options when the borrower selects the optimization technique to minimize the time for completing the task. As shown in flow diagram 700, step 701 calculates the first network option, in which the new borrower may join an existing multiplexer network and, therefore, is willing to wait until the existing borrower's task is completed. The total time to complete the new borrower's task/request can be determined from the following equation:

$$T_{eMUXAHN} = W_{eMUX} + T_{eMUX} + T_{eMUXnlenders} \quad \text{(Equation 1a)}$$

Where:

$T_{eMUXANH}$ is the time (measured in minutes) the borrower needs in total if he uses the lenders who are already in an existing multiplexed network.

$W_{eMUX}$ is the waiting time for the existing multiplexer to finish its task with its existing borrower, $T_{eMUX}$ is the time needed for the existing multiplexer to download from the designated server that the borrower requested, and $T_{eMUXnlenders}$ is the time needed for n lenders (i.e., the number of lenders available that joins the existing multiplexer to fulfill the borrower's request) to complete the download from the multiplexer to the borrower.

Assuming F represents the size of file that the new borrower would like to download, $Bandwidth_{eMUX}$ is the bandwidth of the existing multiplexer, $Bandwidth_{eMUXnlenders}$ is the aggregated bandwidth of these n lenders of the multiplexed Ad hoc network, measured in Mbps. The existing multiplexer is capable of distributing the download task among these n lenders in a such a way that these lenders will complete the job at the same time, then $$T_{eMUX} = (F/Bandwidth_{eMUX})/60, \quad \text{(Equation 1b)}$$

$$T_{MUXnlenders} = (F/Bandwidth_{eMUXnlenders})/60. \quad \text{(Equation 1c)}$$

Step 702 can calculate the second network option, in which the new borrower may ask individual lenders to join a multiplexed gateway. According to this option, total time to complete the borrower's task/request can be determined from the following equation:

$$T_{nMUXAHN} = T_{nMUX} + T_{nMUXnlenders} \quad \text{(Equation 2a)}$$

Where: $T_{nMUXAHN}$ is the total time (measured in minutes) needed for the n lenders to join a new multiplexed network.

$T_{nMUX}$ is the time needed for the new multiplexer to complete the download from the designated server requested by the borrower, and $T_{nMUXnlenders}$ is the time needed for the top fastest n lenders to complete the task, e.g., download, from the multiplexer to the borrower, assuming n is the number of lenders that the borrower would like to use.

Assuming F represents the size of file that the new borrower would like to upload/download, $Bandwidth_{nMUX}$ is the bandwidth of the new multiplexer, $Bandwidth_{nMUXnlenders}$ is the aggregated bandwidth of the n lenders in the multiplexed gateway, then $$T_{nMUX} = (F/Bandwidth_{nMUX})/60, \quad \text{(Equation 2b)}$$

$$T_{nMUXnlenders} = (F/Bandwidth_{nMUXnlenders})/60. \quad \text{(Equation 2c)}$$

Step 703 can calculate the third network option, in which the new borrower may join an existing peer-to-peer network, and, therefore, is willing to wait until the existing borrower completes. The total time to finish the new borrower's task/request can be determined from the following equations:

$$T_{eP2PAHN} = W_{eP2Pnlenders} + T_{eP2Pnlenders} \quad \text{(Equation 3a)}$$

Where: $T_{eP2PAHN}$ is the total time (measured in minutes) needed by the borrower if he uses lenders already in an existing peer-to-peer network.

$W_{eP2Pnlenders}$ is the waiting time for the existing lenders to finish its task with its existing borrower, and $T_{eP2Pnlenders}$ is the time needed for the top n fastest lenders (i.e., the number of lenders available that joins the existing multiplexer to fulfill the borrower's request) to complete the download from a designated server to the borrower in a peer-to-peer network.

Assuming F represents the size of file that the new borrower would like to download, and $Bandwidth_{eP2Pnlenders}$ is the aggregated bandwidth of the n lenders of the existing peer-to-peer ad hoc network, measured in Mbps., then $$T_{eP2Pnlenders} = (F/Bandwidth_{eP2Pnlenders})/60. \quad \text{(Equation 3b)}$$

Step 704 can calculate the fourth network option, in which the new borrower may ask or invite individual lenders to form a new peer-to-peer network. The total time to finish the new borrower's task/request can be determined from the following equations:

$$T_{nP2PAHN} = T_{nP2Pnlenders}$$

Where: $T_{nP2PAHN}$ is the total time (measured in minutes) needed by the borrower if he asks the n lenders to form a peer-to-peer network, and $T_{nP2Pnlenders}$ is the time needed for the top n fastest lenders, where n is the number of available lenders selected (or preselected) by the borrower, to complete the download from a designated server to the borrower in a peer-to-peer network.

Assuming F represents the size of file that the new borrower would like to download, and $Bandwidth_{nP2Pnlenders}$ is the aggregated bandwidth of the top n fastest lenders, then $$T_{nP2Pnlenders} = (F/Bandwidth_{nP2Pnlenders})/60. \quad \text{(Equation 4)}$$

Step 705 can calculate the fifth network, in which the new borrower may join a heterogeneous network composed of both a multiplexer and a peer-to-peer network. The borrower decides the number of lenders he would like to use. By way of example, assuming the new borrower has selected "n" lenders, the new borrower can rank the available lenders according to their bandwidth and select "n" of these available lenders. It may be advantageous for the new borrower to assign the lenders having slower bandwidths to join the multiplexer so as to leverage the faster bandwidth of the multiplexer, and, thereby, utilize the lenders having faster bandwidths to join the peer-to-peer network.

Assuming Bandwidth$_{nMUXklenders}$ is the aggregated bandwidth of the k lenders with the slowest bandwidth who will join the new multiplexed gateway, Bandwidth$_{nMux(k+1)lenders}$ is the aggregated bandwidth of the k+1 lenders with the slowest bandwidth, Bandwidth$_{nMUX}$ is the bandwidth of the new multiplexer, With k being a subset of n, he should assign k lenders with the slowest bandwidth to join the multiplexer such that $$\text{Bandwidth}_{nMUXklenders} \leq \text{Bandwidth}_{nMUX}, \text{ and}$$

Bandwidth$_{nMUX(k+1)lenders}$>Bandwidth$_{nMUX}$ and he can assign the remaining (n-k) lenders to join a peer-to-peer network.

Then $$T_{HetAHN}=(T_{nMUX}+T_{nMUXklenders})=T_{nP2P(n-k)lenders} \quad \text{(Equation 5)}$$

Where: T$_{HetAHN}$ is the total time (measured in minutes) needed by the borrower if he uses a heterogeneous environment composed a multiplexed and a peer-to-peer ad hoc networks, T$_{nMUX}$ is the time (measured in minutes) that the multiplexer needed to download a portion of the file, f$_{nMUX}$ T$_{nMUXklenders}$ is the time (measured in minutes) that the k lenders who is going to join the multiplexed ad hoc network needed to download a portion of the file, f$_{nMUX}$, from the multiplexer, T$_{nP2P(n-k)lenders}$ is the time needed for the n-k lenders forming a peer-to-peer network to download the remaining portion of the file, f$_{nP2P}$, and f$_{nMUX}$+ f$_{nP2P}$=F, i.e., the file to be uploaded/downloaded (Equation 5a)

In this case, we assume the lender will assign a portion of the file he would like to upload/download to the multiplexed ad hoc network and a remaining portion to the peer-to-peer network in a such way that both networks can start and complete the task at essentially the same time.

Further assuming Bandwidth$_{nMUX}$ is the bandwidth of the new multiplexer, Bandwidth$_{nMUXklender}$s is the aggregated bandwidth of k lenders who are going to join the multiplexer, and Bandwidth$_{nP2P(n-k)lenders}$ is the aggregated bandwidth of n-k lenders to join the peer-to-peer network, then:

$$f_{nMUX}/\text{Bandwidth}_{nMUX}+f_{nMUX}/\text{Bandwidth}_{nMUXklenders}=f_nP2P/\text{Bandwidth}nP2P(n-k)\text{lender} \quad \text{(Equation 5b)}$$

Solving the two Equation 5a and 5b, the two unknown file portions, f$_{nMUX}$ and f$_{nP2P}$ can be determined. Moreover, T$_{HetAHN}$ (from Equation 5) can be determined.

Finally, to determine which option to pick, the new borrower can compare the time needed for these options at step 706, and choose the one that requires the minimum time, i.e., min {T$_{eMUXAHN}$, T$_{nMUXAHN}$, T$_{eP2PAHN}$, T$_{nP2PAHN}$, T$_{HetAHN}$}, at step 707. Further, the borrower can predefine and store a preference to select the option resulting in the most time efficient manner.

Figure 8:
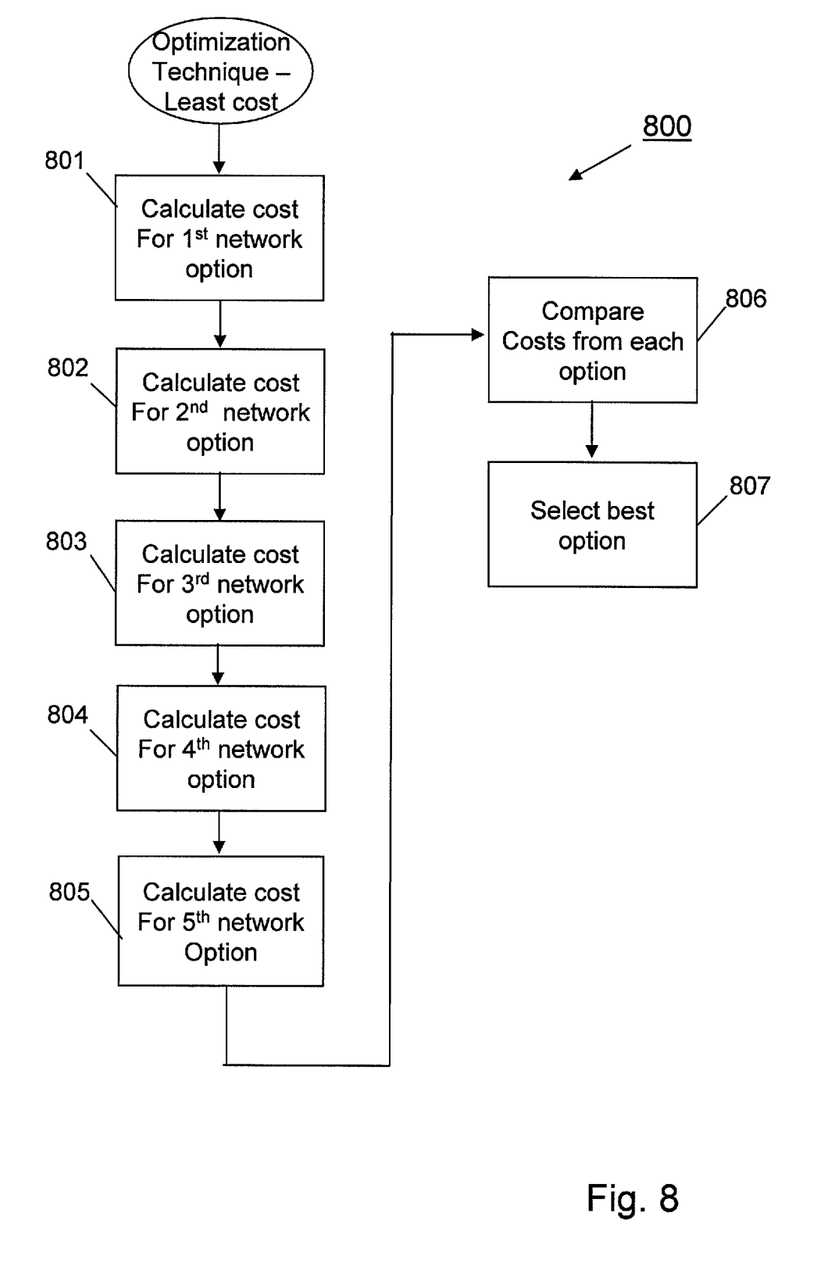
FIG. 8 is a flow diagram for generally implementing optimization for minimum cost in accordance with aspects of the invention.

FIG. 8 illustrates the flow diagram process 800 for calculating network options when the borrower selects the optimization technique to minimize the cost for completing the task. As shown in flow diagram 800, step 801 calculates the first network option, in which the new borrower may join an existing multiplexer network and, therefore, is willing to wait until the existing borrower's task is completed. The total cost to complete the new borrower's task/request can be determined from the following equation:

$$C_{eMUXAHN}=(T_{eMUX}+T_{eMUXnlenders})(\Sigma C_j)$$

Where: C$_{eMUXAHN}$ is the total cost needed for the borrower if he considers using all the lenders who are part of an existing multiplexed ad hoc network, C$_j$ is the cost per minute of each lender j participating with the existing multiplexer, which can include the middleman costs per minute charged by the existing multiplexer, j=1 to n, where n is the number of lenders in the existing multiplexed network, T$_{eMUX}$ is the time needed for the existing multiplexer to download from the designated server requested by the borrower, and T$_{eMUXnlenders}$ is the time needed by for the n lenders to complete the download from the multiplexer to the borrower.

Step 802 can calculate the second network option, in which the new borrower may ask individual lenders to join a multiplexed gateway. According to this option, total cost to complete the borrower's task/request can be determined from the following equation:

$$C_{nMUXAHN}=(T_{nMUX}+T_{nMUXnlenders})(\Sigma C_j)$$

Where:

C$_{nMUXAHN}$ is the total cost needed for the borrower if he considers asking n cheapest lenders to form a new multiplexed network, C$_j$ is the cost per minute of each lender j who is going to be part of the new multiplexer network, and that C$_j$ includes the middleman costs per minute charged by the new multiplexer, j=1 to n, where n is the number of lenders who will join a multiplexed network, T$_{nMUX}$ is the time needed for the new multiplexer to download from the designated server that the borrower requested, and T$_{nMUXnlenders}$ is the time needed by for the n lenders to complete the download from the multiplexer to the borrower.

Step 803 can calculate the third network option, in which the new borrower may join an existing peer-to-peer network, and, therefore, is willing to wait until the existing borrower completes. The total cost to finish the new borrower's task/request can be determined from the following equations:

$$C_{P2PAHN}=T_{P2P}(\Sigma C_j)$$

Where: C$_j$ is the cost per minute of each lender j to be part of the peer-to-peer ad hoc network, j=1 to n, where n is the number of lenders who will join a peer-to-peer network, and T$_{P2P}$ is the time that the n lenders needed in the peer-to-peer ad hoc network to download the file, Step 804 can calculate the fourth network option, in which the new borrower may ask or invite individual lenders to form a new peer-to-peer network. The total cost to finish the new borrower's task/request can be determined from the following equations:

$$C_{P2PAHN}=T_{P2P}(\Sigma C_j)$$

Where: C$_j$ is the cost per minute of each lender j to be part of the peer-to-peer ad hoc network, j=1 to n, where n is the number of lenders who will join a peer-to-peer network, and T$_{P2P}$ is the time that the n lenders needed in the peer-to-peer ad hoc network to download the file, Step 805 can calculate the fifth network option, in which the new borrower may join a heterogeneous network composed of both a multiplexer and a peer-to-peer network. With cost being the optimization objective, the borrower decides the number of lenders he would like to use. The total cost to complete the borrower's task/request can be determined from the following equation:

$$C_{HetAHN} = T_{HetAHN}(\Sigma C_j)$$

Where:

$C_j$ is the cost per minute of each lender j, with which lenders, 1 to k will join the new multiplexed ad hoc network and lenders, k+1 to n will join the peer-to-peer ad hoc network, assuming that n is the number of lenders the borrower would like to use, and lenders 1 to n are ranked according to their bandwidth in ascending order, and $T_{HetAHN}$, which can be determined from Equation 4 above, is the total time (measured in minutes) needed by the borrower if he uses a heterogeneous environment composed of a multiplexed and a peer-to-peer ad hoc networks.

From the above-noted equations for determining cost for the various network options, the calculated costs for completing the task using the n cheapest lenders can be compared at step 806 in order to select cheapest option, i.e., min $\{C_{eMUXAHN}, C_{nMUXAHN}, C_{P2PAHN}, C_{HetAHN}\}$, at step 807.

A further optimization technique selectable by the borrower is availability, which can be considered in terms of a number of drop offs from a lender. Thus, to maximize availability would imply minimizing connection drop-offs, as well as the ability of picking up where it was before the drop off. Even though there is no mechanism to prevent a lender from dropping off in either the peer-to-peer or the multiplexed network, the borrower will react differently in these two environments:

In a peer-to-peer network, if a lender's connection drops off, certain actions should be performed to assist the borrower in completing his or her task. By way of example, a program, e.g., activatable upon a lender drop-off, can be stored, e.g., in the user's device or in a remote location, to keep track of how much data was being uploaded/downloaded by the dropping is lender, and find another lender to fulfill or complete the remaining upload/download.

In a multiplexed network, it may not be the borrower's responsibility to address lender drop-offs, i.e., the multiplexer may have the ability to monitor each lender's performance in the network. Thus, if any of the lenders get disconnected, the multiplexer can keep track of how much was being uploaded/downloaded by the dropping lender, and assign the remaining piece or part of the task to other lenders who may have faster and more stable connections. From the foregoing, the connection drop-offs in the multiplexed network can be transparent to the borrower because the multiplexer can find substitute lenders to complete the tasks of the drop-off lender. Thus, for the borrower, it may be advantageous to join a multiplexed ad hoc network since any drop-offs encountered are handled/corrected by the multiplexer without borrower's input.

Another optimization technique for selection by the borrower can be to leverage the capability of different types of ad hoc networks. In general, a multiplexer can provide a fast wired internet connection. To leverage this capability, it may be beneficial for the borrower to use a multiplexed ad hoc network to upload/download a big file, or to perform server-side intensive tasks (i.e., tasks that may require stable connection to the servers). Conversely, a peer-to-peer ad hoc network can be used for less server-intensive jobs, e.g., browsing a web page where content of a web page is loaded once and remains pretty much static until the borrower accesses another link.

While the instant invention for optimizing the selection of lenders by a borrower, it is understood that the illustrated examples provided are for the purpose of explanation and are not to be construed as limiting. Thus, it is understood that borrowers may optimize their selection of lenders according to other criteria without departing from the scope of the invention. Further, it is understood that the process discussed with regard to the illustrated examples is likewise provided for ease of explanation, and should not be construed as limiting. Thus, it is understood borrowers may utilize different procedures in optimizing their selection of lenders according to the criteria of the invention without departing from the scope of the invention.

While the invention has been described in terms of embodiments, those skilled in the art will recognize that the invention can be practiced with modifications and in the spirit and scope of the appended claims. For example, while the embodiments have been described with reference to exemplary illustrations and processes, those skilled in the art will recognize that the invention can be practiced with any number of lenders, files, file portions, ISPs, and/or remote locations. Additionally, it should be recognized that a combination of any of the above options may be implemented, where appropriate.

What is claimed:

1. A method, comprising:

identifying available lenders and existing networks within a vicinity of a borrower;

selecting an optimization technique for completing a task of the borrower;

calculating, for a plurality of network options, a value for completing the borrower's task according to the optimization technique; and selecting an optimum network option to complete the borrower's task, wherein the plurality of network options includes forming a heterogeneous network composed of both a peer-to-peer network and a multiplexed network, wherein the borrower's task comprises one of an upload and a download of the at least one file, and further comprising dividing the at least one file into parts and distributing the parts among the lenders of the selected optimum network option for the one of uploading or downloading, and reassembling the parts of the at least one file after the one of the upload and the download; and identifying the borrower as a new borrower;

wherein, when the new borrower selects minimizing time as the optimization technique, the method further comprises selecting a number of the available lenders for the calculating, which comprises calculating an amount of time for each network option to complete the borrower's task; and wherein, for the heterogeneous network, the method further comprises:

ranking the number of available lenders according to their available bandwidth;

based on the ranking, assigning lower bandwidth available lenders of the number of available lenders to a multiplexer in a multiplexed bandwidth sharing ad hoc network; and based on the ranking, assigning the remaining available lenders of the number of available lenders to form a peer-to-peer bandwidth sharing ad hoc network.

2. The method of claim 1, wherein optimization technique comprises at least one of fastest time for completion of task, least expensive completion of task, minimizing risk of drop-offs, and maximizing lender capabilities.

3. The method of claim 1, wherein the plurality of network options further includes joining an existing multiplexed network, joining an existing peer-to-peer network, forming a new multiplexed network, and forming a new peer-to-peer network.

4. The method of claim 1, wherein the new borrower is not currently part of an existing network.

5. The method of claim 1, wherein the network options further include joining an existing multiplexed network, joining an existing peer-to-peer network, forming a new multiplexed network, and forming a new peer-to-peer network, and the calculated amount of time includes a wait time for the existing networks to complete existing tasks.

6. The method of claim 5, further comprising:
comparing each of the calculated amounts of time; and
identifying the optimum network option for selection.

7. The method of claim 1, wherein, when the new borrower selects minimizing cost as the optimization technique, the method further comprises selecting a number of the available lenders for the calculating, which comprises calculating an amount of money for each network option to complete the borrower's task.

8. The method of claim 7, wherein the network options further include joining an existing multiplexed network, joining an existing peer-to-peer network, forming a new multiplexed network, and forming a new peer-to-peer network, and the method further comprises comparing each of the calculated amounts of cost and identifying the optimum network option for selection.

9. The method of claim 1, further comprising:
one of forming and joining the selected optimum network option;
performing the borrower's task; and
monitoring performance of the selected network option.

10. The method of claim 9, wherein the monitoring of performance of the selected optimum network option comprises determining whether a diminution in performance related to the optimization technique has occurred in the borrower's selection of the optimum network option.

11. The method of claim 10, wherein the borrower predefines a percentage value related to an acceptable diminution in performance of the selected optimum network option from that expected when the optimum network option was selected.

12. The method of claim 11, wherein, when the diminution in performance exceeds the predefined percentage value, the method further comprises:
determining how much of the task remains to be completed;
determining, for the plurality of network options, a value for completing the remaining task according to the optimization technique; and
selecting a new optimum network option to complete the remaining task.

13. The method of claim 1, further comprising identifying the borrower as an existing borrower.

14. The method of claim 13, wherein the existing borrower is currently part of an existing network.

15. The method of claim 13, further comprising:
monitoring performance of the selected optimum network option.

16. The method of claim 15, wherein the monitoring of performance of the selected optimum network option comprises determining whether a diminution in performance related to the optimization technique has occurred in the borrower's selection of the optimum network option.

17. The method of claim 16, wherein the borrower predefines a percentage value related to an acceptable diminution in performance of the selected optimum network option from that expected when the optimum network option was selected.

18. The method of claim 17, wherein, when the diminution in performance exceeds the predefined percentage value, the method further comprises:
determining how much of the task remains to be completed;
determining, for the plurality of network options, a value for completing the remaining task according to the optimization technique; and
selecting a new optimum network option to complete the remaining task.

19. The method of claim 3, further comprising:
one of forming and joining the selected new optimum network option; and
completing the remaining task.

20. The method of claim 1, wherein the identifying, the selecting an optimization technique, the calculating, and the selecting an optimum network are provided by a service provider on a fee and/or subscription basis.

21. The method of claim 1, wherein a service provider at least one of creates, deploys, maintains, supports an infrastructure for implementing the identifying, the selecting an optimization technique, the calculating, and the selecting an optimum network.

22. The method of claim 1, wherein the identifying, the selecting an optimization technique, the calculating, and the selecting an optimum network are performed in a suitable architecture as part of an ad hoc mobile network.

* * * * *